United States Patent [19]
Mann

[11] Patent Number: 6,047,498
[45] Date of Patent: Apr. 11, 2000

[54] TERMITE-PROOFING SYSTEM

[75] Inventor: Bradley Mann, Burswood, Australia

[73] Assignee: Termguard PTY Ltd., Australia

[21] Appl. No.: 08/912,003

[22] Filed: Aug. 15, 1997

[30] Foreign Application Priority Data

Aug. 16, 1996 [AU] Australia ............................... PO 1694

[51] Int. Cl.⁷ .................................................. A01M 7/00
[52] U.S. Cl. .......................................................... 43/132.1
[58] Field of Search ..................... 43/124, 132.1

[56] References Cited

U.S. PATENT DOCUMENTS

| | | |
|---|---|---|
| 1,795,488 | 3/1931 | Hill . |
| 1,894,446 | 1/1933 | McKenny . |
| 2,347,776 | 5/1944 | Gunn . |
| 2,661,512 | 12/1953 | Kretschmar ............................... 43/124 |
| 2,842,892 | 7/1958 | Aldridge et al. . |
| 2,981,025 | 4/1961 | Woodson . |
| 3,151,746 | 10/1964 | Reustle et al. . |
| 3,209,485 | 10/1965 | Griffin . |
| 3,330,062 | 7/1967 | Carter . |
| 3,330,120 | 7/1967 | Atkinson . |
| 3,422,626 | 1/1969 | Hanrahan . |
| 3,602,248 | 8/1971 | Peacock ..................................... 43/124 |
| 3,774,556 | 11/1973 | Poll . |
| 3,782,026 | 1/1974 | Bridges et al. ............................ 43/124 |
| 3,911,611 | 10/1975 | Brinker . |
| 4,297,055 | 10/1981 | Peacock . |
| 5,007,197 | 4/1991 | Barbett . |
| 5,184,418 | 2/1993 | Fletscher .................................... 43/124 |
| 5,317,831 | 6/1994 | Fletscher .................................... 43/124 |
| 5,347,749 | 9/1994 | Chitwood et al. ......................... 43/124 |
| 5,378,086 | 1/1995 | Campbell, Jr. et al. .................. 43/124 |
| 5,819,466 | 10/1998 | Aesch et al. ............................... 43/123 |

FOREIGN PATENT DOCUMENTS

| | | |
|---|---|---|
| B-76392/81 | 4/1983 | Australia . |
| 45891/85 | 2/1986 | Australia . |
| B-60111/86 | 5/1987 | Australia . |
| B-67663/90 | 6/1991 | Australia . |
| B-61939/90 | 7/1991 | Australia . |
| B-72821/91 | 12/1991 | Australia . |

*Primary Examiner*—Thomas Price
*Attorney, Agent, or Firm*—Finnegan, Henderson, Farabow, Garrett & Dunner, L.L.P.

[57] ABSTRACT

The present invention provides a pipe system for termite-proofing a sub-floor area of a structure having a foundation penetrated by at least one penetration including a primary tube system having tube(s) located substantially at or adjacent the perimeter of the building, a secondary tube system having tube(s) adjacent at least one penetration, and a charging structure for charging both the primary and secondary tube systems with insecticide. The tube systems comprise tubes perforated along a substantial portion of their length by a plurality of apertures of such size and spacing that insecticide flows through the apertures and infuses the adjacent ground. The penetrations may take the form of plumbing pipelines or load bearing member for a suspended slap or floor.

14 Claims, 5 Drawing Sheets

TERMITE-PROOFING SYSTEM

BACKGROUND OF THE INVENTION

This invention relates to a method of termite-proofing sub-floor areas of buildings employing pipe systems for infusing termiticide into adjacent ground.

In Australian Patent No. 583405, we have described a particularly effective method and system for termite-proofing buildings having a concrete foundation and a plastic waterproof sheet beneath the foundation and overlying ground adjacent the foundation. The termite-proofing method is implemented through a pipe system comprising two sub-systems of tubes. The primary tube sub-system comprises a network of tubes lying at regular spacings throughout the floor area, at least some of the tubes lying adjacent the foundation of the building and beneath the plastic waterproof sheet. The secondary tube sub-system is located in the vicinity of the perimeter of the foundation. Ready access to both of these tube sub-systems is achieved by means of at least one tube extension having an end which is readily accessible from above ground and which is closed by a removable closure cap. In this way, a liquid termiticide can easily be poured into the tube sub-systems for the initial treatment, and also for any re-treatments which may be necessary. The tubes of both tube sub-systems are perforated by a plurality of apertures spaced along their lengths, the apertures being of such size and spacing that, when the termiticide is injected (preferably high volume, low pressure) through the above-ground tube extension, it flows through the apertures and infuses the ground adjacent the foundation of the building.

Despite the undoubted effectiveness of this system, its relatively high cost is a drawback in relation to economy housing developments. There is a need for a cheaper alternative which still allows for re-treatment, particularly of critical areas (ie the areas which are most prone to attack by subterranean termites). As recommended in Australian Standard, the contents of which are hereby incorporated by reference 3660,1-1995, the critical areas are eg "wet" areas, such as bathrooms, toilets and kitchens, perimeter edges and construction joints.

Although in some situations, the termite-proofing system of the present invention may be used to apply both the initial chemical barrier and for any re-treatments which may be necessary, it is generally recommended that the system merely be used for re-treatments. In most circumstances, it will be necessary to apply an initial chemical barrier by conventional means, such as hand-spraying of termiticide.

At present, the termiticides for Australian use are registered by the National Registration Authority for Agricultural Chemists. Such termiticides should be used to re-treat high-risk areas every three to ten years. Future chemical developments may require more or less frequent re-application to these critical areas.

It is the object of the present invention to provide a convenient and relatively cheap method of treatment or re-treatment for significant eradication of termites in the sub-floor area and adjacent thereto.

With this object in view, the present invention provides a pipe system for termite-proofing a sub-floor area of a structure having a foundation penetrated by at feast one penetration comprising:

(a) a primary tube system comprising at least one tube located substantially at or adjacent the perimeter of the building;

(b) a secondary tube system comprising at least one tube adjacent at least one penetration; and (c) means for charging both primary and secondary tube system with insecticide;

wherein the tube systems comprise tubes perforated along a substantial portion of their length by a plurality of apertures of such size and spacing that insecticide flows through the apertures and infuses the adjacent ground.

SUMMARY OF THE INVENTION

Typically, the penetration takes the form of a plumbing pipeline but it could take the form of a load bearing member or pier in a suspended slab or wooden floor construction or the like.

The charging means may include a tube extension in communication with at least one of the primary tube system and secondary tube system having an end which is closed by a removable closure cap. Preferably, the primary and secondary tube systems are interconnected, with a single tube extension providing insecticide to both. The tube extension end is advantageously readily accessible from above ground and the closure cap is such as to maintain a pressure in the tube systems sufficient to enable infusion of termiticide into the adjacent ground. Termiticide may be injected or pumped into the tube extension and ultimately infused into the ground through the pipe system.

Preferably, the insecticide is pumped into the system through the charging means under a pressure of eg 10 to 40 kPa. In particular, for 40 mm pipes, the preferred pressure for treating and flushing is 14 to 16 kPa, whereas for 15 mm pipes it is 27 to 30 kPa.

The primary tube system may include tubes generally defining the perimeter of a building foundation. Tubes may be provided generally adjacent the inner edge of the foundation, an inner perimeter pipe, and/or generally adjacent the external perimeter of the foundation, an external perimeter pipe. Both are advantageously provided together in the case of an infill/footing foundation. In the case of a monolithic slab, the inner perimeter tube may be omitted. The perimeter pipe(s) may be laid generally parallel the perimeter of the foundation. Other foundation types commonly used in United States and Japan are maybe termite proofed in accordance with the present invention.

The secondary tube system includes at least a tube adjacent a penetration at the least though it is generally preferable that each penetration is at least substantially surrounded, and more preferably completely surrounded, by a tube or tubes in the form of a grid system fed with termiticide either from a perimeter tube forming part of the primary tube system (inner or external) or from a manifold or common supply communicating with the charging means and delivering termiticide to the various penetrations or "wet" areas of the structure. Any manifold or supply may be located generally centrally of the building or structure though this is not mandated. The secondary tube system could be fed either from an inner or external perimeter tube with which it conveniently is directly connected. The secondary tube system is most conveniently integral with the charging means and it is not desirable that each tube system protecting each "wet" area be separately charged by separate charging means. Common supply is preferred. A major advantage of the system is its integral nature, at least insofar as the protection of each penetration or "wet" area is concerned.

The pipe system of the invention is not confined in its nature to the particular type of foundation construction employed, concrete or otherwise. It may also form part of a termite-proofing solution involving other means of termite eradication. The invention preferably involves use of plastics such as PVC for manufacture of the tubes which has advantages in terms of costs and ready adaptation to different types of building structure without complex redesign and adjustment of pipe layout.

In another aspect, the invention is a means for termite-proofing a sub-floor area of a building having a concrete foundation penetrated by one or more plumbing pipelines, and a waterproof sheet beneath the foundation and overlying ground adjacent the foundation comprising:

(a) a primary tube system comprising at least one tube located at or adjacent the perimeter of the building; and
(b) a secondary tube system comprising at least one tube adjacent one of said plumbing pipeline(s) and beneath said waterproof sheet, said primary tube system and said secondary tube system each joining into a tube extension having an end which is readily accessible from above ground and which is closed by a removable closure cap, and said tubes being perforated along their length by a plurality of apertures, the apertures being of such size and spacing that, when liquid insecticide is injected through a said tube extension, it flows through said apertures and infuses the adjacent ground.

An alternative to a treatment or re-treatment system such that as that of the present invention would be to disrupt the building by drilling and injecting termiticide through the slab, including any tiles, slate, marble etc. Such a procedure is expensive, messy, obtrusive and dangerous.

The invention will now be described in more detail with respect to a particular embodiment of the invention. This embodiment, which is illustrative but not restrictive of the present invention, is described hereunder with reference to the accompanying drawings in which:

DETAILED DESCRIPTION

Figure 1:
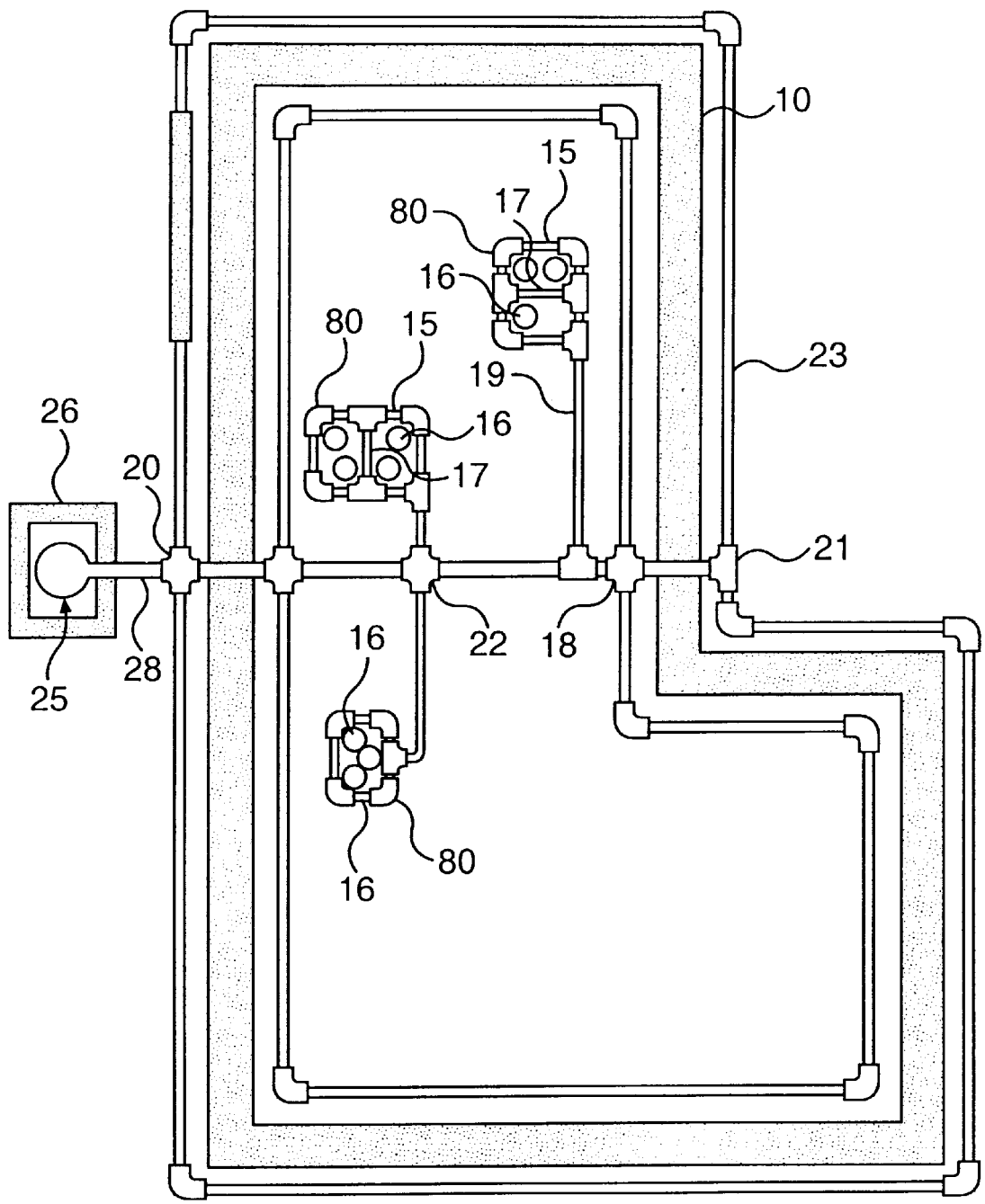
FIG. 1 is a plan view of the termite-proofing system of the present invention.

Referring now to FIG. 1, a building has a concrete foundation 10 and external walls 11. By concrete is meant any material generally having the same properties and equally useful for constructing foundations. Each external wall comprises internal brickwork or stud wall 12 and external brickwork 13 though walls could be built of other materials, wood, for instance. The foundation 10 includes minor foundation portions (not shown) for supporting interior walls and also an external path 14 for the shedding of water. The foundation 10 is peripheral to a slab concrete floor. However, the slab is not shown, for the sake of simplicity.

The tubing of the termite-proofing system is preferably formed from a suitable plastic, such as PVC, having cost and construction advantages as described above.

The secondary tube system-designed primarily to protect the building from termites moving into the building through cavities or cracks between plumbing pipelines 16 and the slab takes the form, in the embodiment shown, of grid system(s) 80 installed around all wet areas, thus providing, on infusion of termiticide, a chemical barrier around all plumbing penetrations or pipelines. In this embodiment, 20 mm perforated pipes 15 are constructed in a square of rectangle around plumbing pipeline(s) 16. This arrangement is advantageous to provide even distribution of insecticide to these critical areas when re-treating though other shapes of surrounding pipes, for example circular could be used. It is particularly important that termite proofing be effective in these areas so ideally each grid system 80 comprises tubes completely surrounding each plumbing pipeline 16. Intermediate perforated tubes 17 may be required to negate any "shadowing" by the plumbing pipelines 16 of infusion of the termiticide through the ground area to be treated. Termiticide is fed at low pressure to the perforated pipes 15 and 17 via manifold 18, which is connected to non-perforated feeder pipes 19 by means of crossovers 20 or TEE pieces 21.

Figure 3:
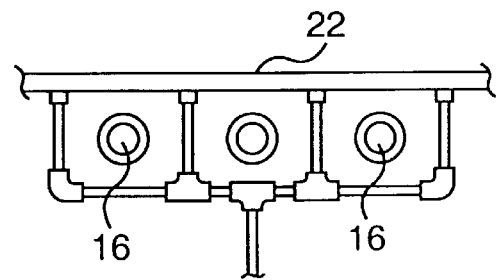
FIG. 3 is an alternative arrangement of the perforated tubes of the primary tube system.

If the plumbing pipelines 16 are too close to the internal perimeter tube 22 to allow for an enclosed grid system 80 as shown in FIG. 1, a system of capped "legs", as shown in FIG. 3, may be used instead. Preferably, there should be a perforated tube 15 or 17 within 400 mm, and preferably within 150 mm, of each plumbing pipeline 16.

It will be understood that manifold 18, located generally centrally of the foundation 10, is a common supply of termiticide to each grid system 80 and this is an advantageous mode of construction that allows the building to be treated and re-treated quickly and efficiently using one charging means, the filler point assembly 25 and the associated tube extension 28.

Description now follows of the primary tube system designed to protect access of termites through the perimeter of the foundation. The description is made with reference to FIG. 2.

The inner perimeter pipe 22 is preferably formed from 20 mm perforated pipework laid within 150 mm of the inner edge of the foundation 10. The external perimeter pipe 23 is installed within 150 mm of the outer edge of the foundation 10, and is also preferably formed from 20 mm perforated pipework.

The inner perimeter pipe 22 is located in a pre-prepared (compacted) soil bed, beneath the waterproof sheet (water vapour membrane). The waterproof sheet will generally be formed from an appropriate plastic material, eg PVC. It is important to note that this inner perimeter tube may be omitted, particularly in the case of a monolithic slab construction.

Similarly, the external perimeter pipe 23 is located in a purpose-built trench, and is covered with a strip of agricultural sheeting 24, such as "Permecover".

Insecticide is injected into both the primary and secondary tube systems communicating through tube extension 28 with filler point assembly 25, which incorporates a non-return valve to facilitate charging of the system with termiticide-particularly preferably clorpyrifos or bifenthrin. The filler point assembly 25 is preferably located in the vicinity of external path 14. For safety reasons, the filler point assembly should be enclosed within a child-proof trap 26. The child-proof trap may be set into the soil and compacted so that the lid of the trap is level with the finished level of the paving used. This allows ready access to the filler point assembly, for injecting termiticide in the primary and secondary tube systems. Termite-proofing re-treatments can readily be carried out, but without compromising the safety of children etc in the meantime. The filler point assembly may be mounted on a wall and bricked around.

As with the primary tube system, the insecticide is distributed to the secondary tube system (internal and external perimeter tubes) via manifold 18 and crossovers 20 or TEE pieces 21.

Figure 2:
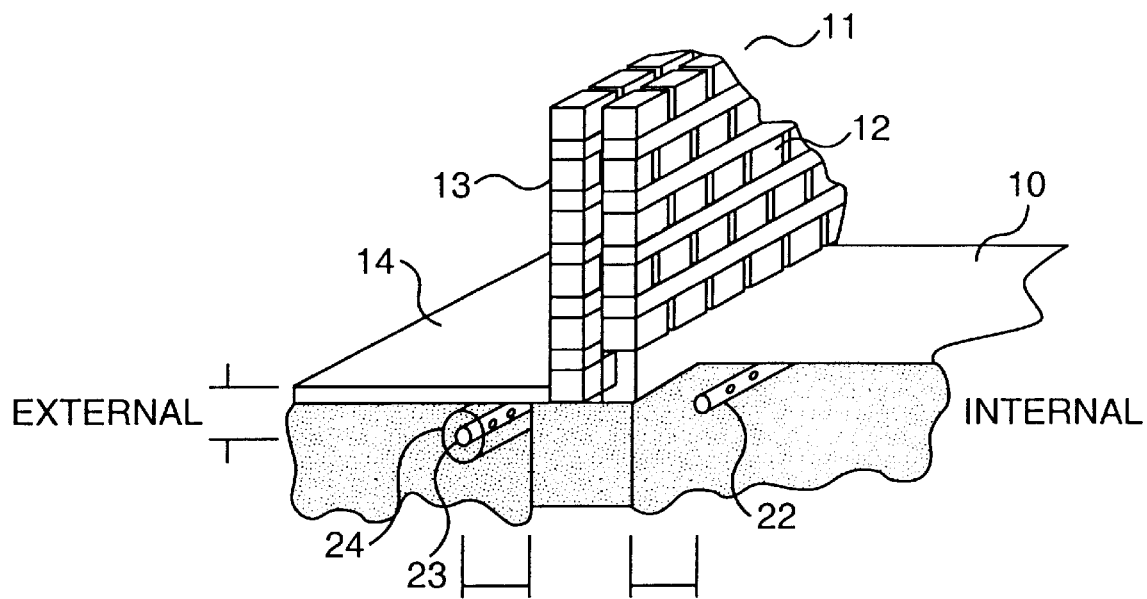
FIG. 2 illustrates the arrangement of the secondary tube system, comprising internal and external perimeter tubes.

While FIGS. 1 and 2 show that the tube extension 28 communicates with both the primary and secondary tube systems using a common supply or manifold 18 and feeder pipes 19 it is to be understood that each system could be charged through separate tube extensions. However, the arrangement shown is highly integrated and this is advantageous in many situations.

Figure 4:
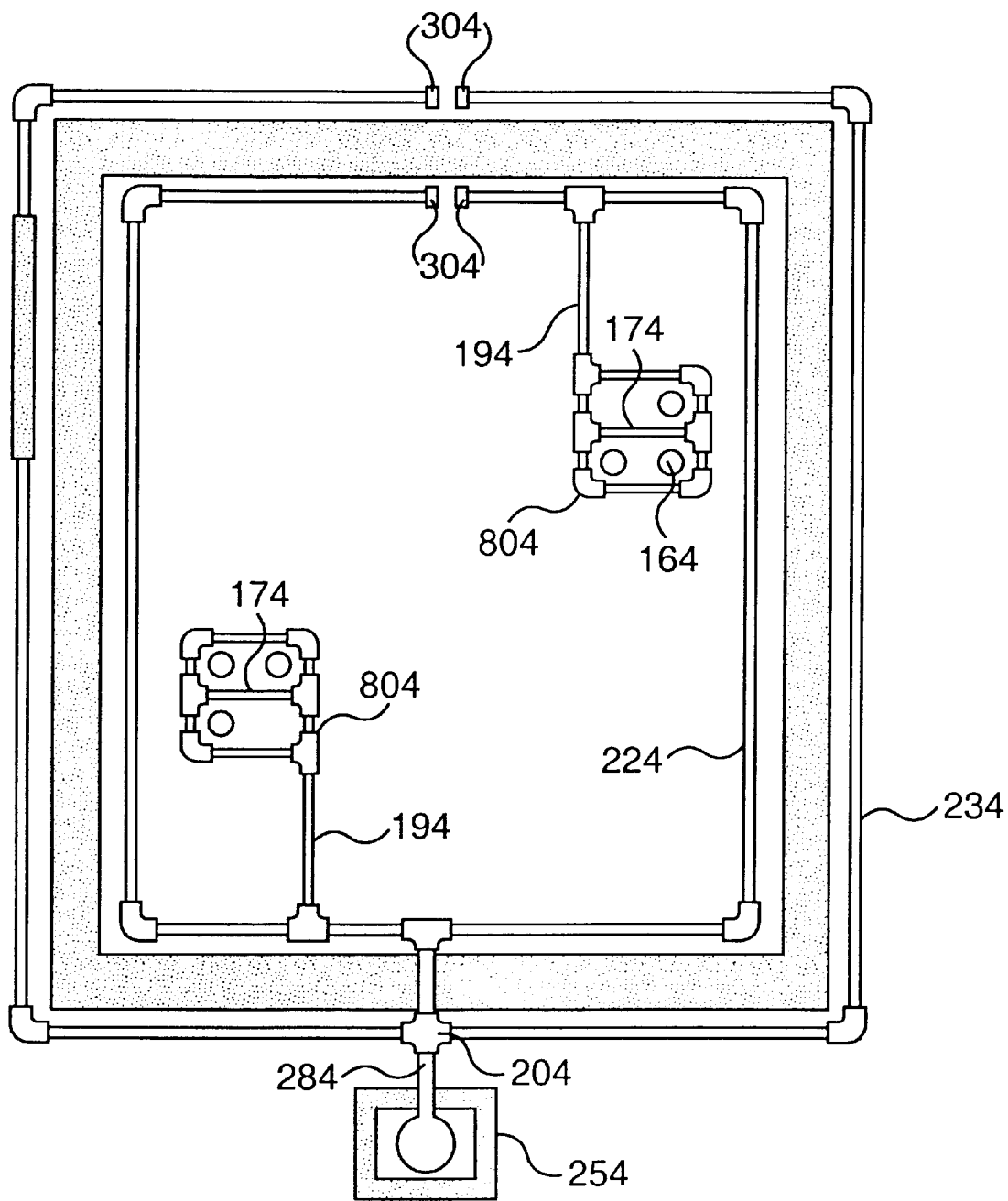
FIG. 4 is a plan view of an alternative arrangement for the termite-proofing system of the present invention.

An alternative supply arrangement for an infill/footing slab is shown in FIG. 4 where, although grid system 804, protecting penetrations 164, are commonly supplied with insecticide, the common means of supply takes the form of the inner perimeter pipe 224, remembering that the inner perimeter pipe 224 may be omitted for some foundation types. The inner perimeter pipe 224 is directly connected with crossovers 204 to the grid system 804. It is to be noted that the inner perimeter pipe 224 and external perimeter pipe 234 are capped at a point opposed to the filler point assembly 254 by caps 304. Feeder pipes 194 are not usually to be provided with apertures. Manifold 18 is omitted.

Figure 5:
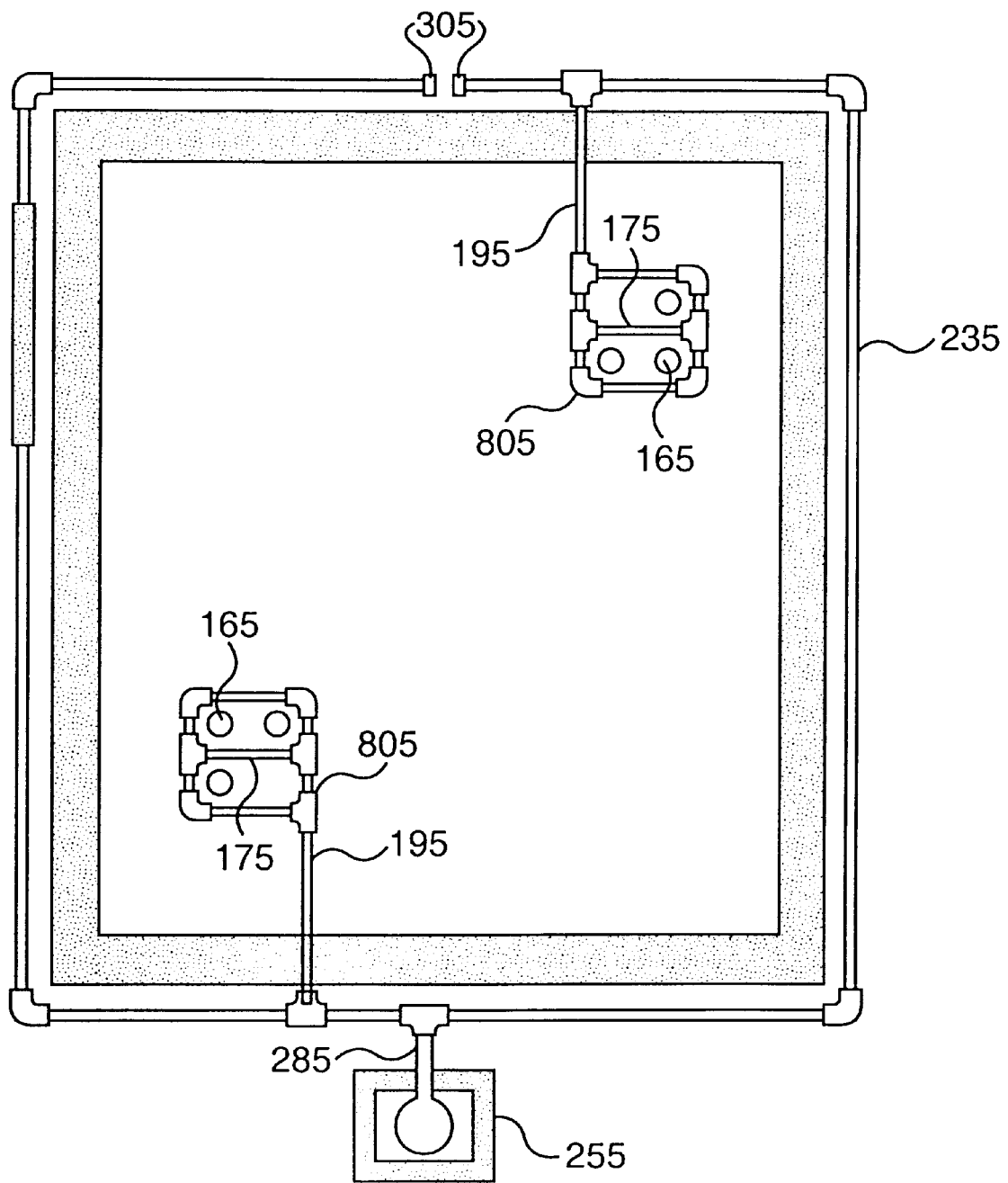
FIG. 5 is another arrangement for the termite proofing system suitable for a monolithic slab construction.
Figure 6:
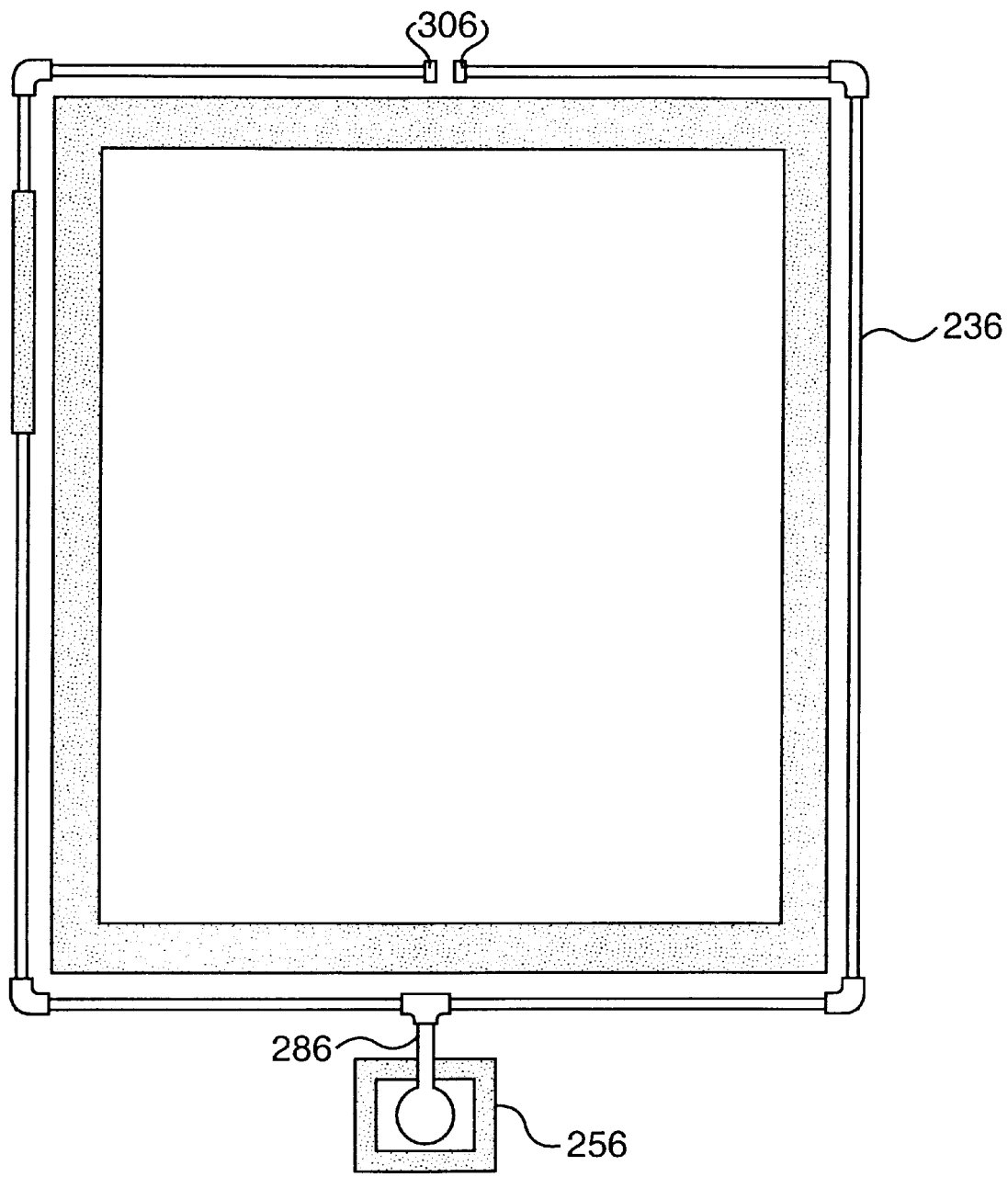
FIG. 6 illustrates an arrangement of external perimeter pipe termite proofing which surrounds the edge of the foundation.

A still further arrangement is shown in FIG. 5, suitable for a monolithic slab construction, wherein the inner perimeter pipe and manifold 18 are omitted. External perimeter pipe 235 supplies grids 805 by feeder lines 195, not usually apertured. The external perimeter pipe 235 is directly connected to grids 805 by feeder lines 195. Again, the external perimeter pipe 235 is capped by caps 305 at a point opposite filler point assembly 255.

In summary, the termite-proofing means of the present invention provides a relatively cheap yet effective means of re-treating critical areas of a building, ie wet areas having a plumbing pipeline penetrations, the inner edges of the slab, and the perimeter of the footing.

In another inventive aspect the slab penetrations are not specifically protected. The sole pipe of the termite proofing system takes the form of external perimeter pipe 236 which surrounds the edge of the foundation. This external perimeter pipe arrangement is likewise charged with insecticide by filler point assembly 256. Grids 805 and feeder lines 195 of FIG. 5 are omitted. This may be suitable for buildings or structures not having slab penetrations, especially those having monolithic slab construction.

While the present invention has been described in terms of a preferred embodiment in order to facilitate better understanding of the invention, it should be appreciated that various modifications can be made without departing form the principles of the invention. Therefore, the invention should be understood to include all such modifications within its scope.

I claim:

1. A pipe system for termite-proofing a sub-floor area of a structure having a foundation penetrated by at least one penetration, comprising:
   (a) a primary tube system comprising at least one tube located substantially at or adjacent to the perimeter of the building;
   (b) a secondary tube system comprising at least one tube adjacent to at least one penetration; and
   (c) means for charging both the primary and secondary tube systems with insecticide;
   wherein each of the tube systems comprise tubes perforated along a substantial portion of their length by a plurality of apertures of such size and spacing that insecticide flows through the apertures and infuses the adjacent ground.

2. The pipe system of claim 1 wherein the primary and secondary tube systems are inter-connected.

3. The pipe system of claim 1 wherein a penetration is substantially surrounded by a grid system of pipes comprising the secondary tube system.

4. The pipe system of claim 1 wherein a plurality of penetrations are protected by a plurality of grid systems fed with insecticide from a common insecticide supply means delivering to each grid system.

5. The pipe system of claim 1 wherein the charging means charges insecticide to one of the primary and secondary tube systems at low pressure.

6. The pipe system of any one of the preceding claims wherein the primary and secondary tube systems are charged with insecticide through a tube extension communicating with at least one of the primary and secondary tube systems.

7. The pipe system of claim 6 wherein an end of the tube extension is located above ground and is fitted with a removable closure cap.

8. The pipe system of claim 1 wherein the penetration is a plumbing pipeline.

9. The system of claim 1 wherein the primary tube system comprises an inner perimeter pipe defining an inner edge of a foundation and an external perimeter pipe defining an outer edge of the foundation.

10. The system of claim 1 wherein the primary tube system comprises an external perimeter pipe defining an outer edge of the foundation.

11. A system as claimed in claim 9 wherein said secondary tube system is connected directly to one of said inner perimeter pipe and said external perimeter pipe.

12. A system as claimed in claim 10 wherein said secondary tube system is connected directly to said external perimeter pipe.

13. A means for termite-proofing a sub-floor area of a building having a concrete foundation penetrated by at least one plumbing pipeline, and a waterproof sheet beneath the foundation and overlying ground adjacent the foundation comprising:

(a) a primary tube system comprising at least one tube located at or adjacent the perimeter of the building; and (b) a secondary tube system comprising at least one tube adjacent the at least one pipeline and beneath said waterproof sheet, wherein said primary tube system and said secondary tube system each join into a tube extension, said tube extension having an end which is readily accessible from above ground and which is closed by a removable closure cap, and wherein said tubes are perforated along their length by a plurality of apertures, the apertures being of such size and spacing that, when liquid insecticide is injected through said tube extension, it flows through said apertures and infuses the adjacent ground.

14. A pipe system for termite-proofing a sub-floor area of a structure having a foundation penetrated by at least one penetration, comprising:

(a) a primary tube system including at least one tube located substantially at or adjacent to the perimeter of the building;

(b) a secondary tube system including at least one tube surrounding at least one penetration; and (c) means for charging both the primary and secondary tube systems with insecticide;

wherein each of the tube systems comprise tubes perforated along a substantial portion of their length by a plurality of apertures of such size and spacing that insecticide flows through the apertures and infuses the adjacent ground.

* * * * *